R. C. NEELY.
FENCE.
APPLICATION FILED OCT. 28, 1916.
1,214,705.
Patented Feb. 6, 1917.
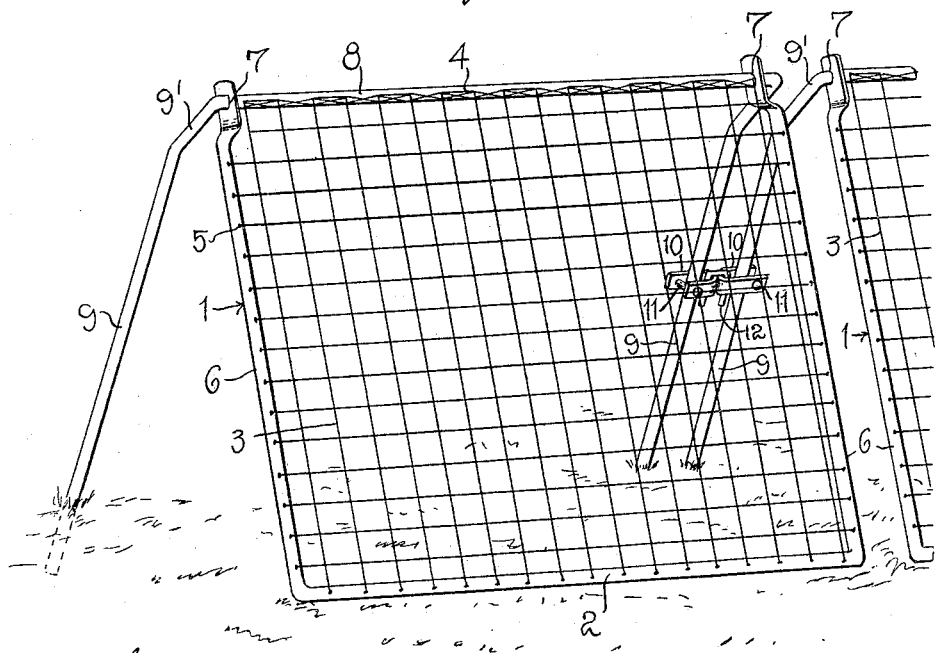
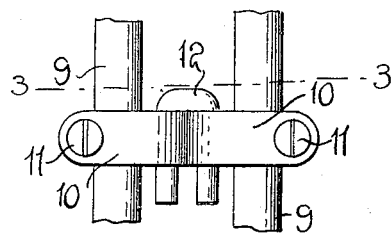
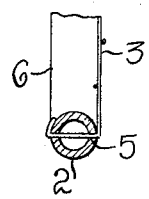
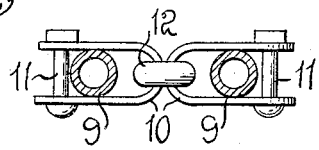
Inventor
ROBERT C. NEELY
By Watson E. Coleman
Attorney

UNITED STATES PATENT OFFICE.

ROBERT C. NEELY, OF WAYNESBORO, GEORGIA.

FENCE.

1,214,705.  Specification of Letters Patent.  Patented Feb. 6, 1917.

Application filed October 28, 1916. Serial No. 128,288.

*To all whom it may concern:*

Be it known that I, ROBERT C. NEELY, a citizen of the United States, residing at Waynesboro, in the county of Burke and State of Georgia, have invented certain new and useful Improvements in Fences, of which the following is a specification, reference being had to the accompanying drawings.

This invention comprehends certain new and useful improvements in fences, and the invention has for its primary object an improved fence made up in a plurality of corresponding sections that may be very easily secured in place side by side or in alinement with each other, according to the extent of fence required, or the amount of ground to be fenced in, and the invention also has for its object a practical, durable and efficient construction of fence of this character, the parts of which may be very easily and cheaply manufactured and readily assembled and quickly set up, as desired, the parts being further so formed and arranged that they may be shipped in a relatively knockdown relation to each other, so as to occupy a minimum amount of space and thereby reduce the freight rates.

A still further object of the invention is an improved construction of fence, each section of which embodies a swinging frame hingedly connected to the standards that are designed to be partially embedded or otherwise firmly secured in the ground, whereby any section frame may be raised temporarily or supported in a raised position to serve as a gate so as to permit of the ingress and egress of animals or the like at any desired point. And the invention also aims to generally improve devices of this class so as to render them more useful and commercially desirable.

With these and other objects in view, as will more fully appear as the description proceeds, the invention consists in certain constructions, arrangements and combinations of the parts that I shall hereinafter more fully describe and claim.

For a full understanding of the invention, reference is to be had to the following description and accompanying drawing, in which—

Figure 1 is a perspective view of a portion of a fence embodying the improvements of my invention. Fig. 2 is a fragmentary view showing the connection between the two adjoining sections of the fence. Fig. 3 is a fragmentary view on the line 3—3 of Fig. 2, and Fig. 4 is a fragmentary section through one of the frame bars.

Corresponding and like parts are referred to in the following description and designated in the views of the accompanying drawing by like reference characters.

As indicated in the foregoing part of the specification, and as clearly illustrated in the accompanying drawing, my improved fence comprises a plurality of corresponding sections, each section being designated 1 as a whole. Each section of the fence embodies a substantially U-shaped frame 2 preferably composed of a metallic rod bent intermediate of its ends to produce the desired formation, and a filling 3 of any desired wire construction as, for example, a section of woven wire of any preferred mesh, as illustrated in the drawing, or line and picket wires secured together and to the frame 2 in any desired way. In the present embodiment of the invention, the filling 3 consists of woven wire, as above specified, the upper ends of the wires being interwoven, as indicated at 4, and the lower ends of the vertical wires and the ends of the horizontal wires extending through openings 5 formed in the bar which constitutes the frame 2, the extremities being turned over upon the bar so as to securely maintain the wire filling in position.

The ends 6 of the bar which constitute the frame 2, are preferably turned slightly inward, that is, toward each other, and are flattened, as shown, said flattened ends being formed with apertures 7 to receive the cross bar 8 which connects together the two legs or standards 9 that are designed to be partially embedded in the ground or otherwise secured firmly in position, preferably at an oblique angle to the vertical, as clearly illustrated in the drawing.

In order to secure the sections 1 together, I employ in the present instance preferably U-shaped clips 10 that are secured to the adjoining legs 9 by bolts 11 or similar fastening devices, and each leg may be provided with any desired number of clips, and the clips may be secured to the legs at any desired points. Adjoining clips are secured together in any desired detachable manner as, for example, by yoke members 12 slipped down upon and embracing the clips, as clearly shown. Preferably, the legs or standards 9 are offset at their upper ends as indicated at 9′, whereby the frames may be folded flat against the standards when it is desired to ship the sections, or store them away.

From the foregoing description, in connection with the accompanying drawing, the operation of my improved fence construction will be apparent. In the practical use of this fencing, any desired number of these correspondingly formed sections 1 are arranged side by side, according to the extent of fence required, the legs or standards 9 being partially embedded in the ground or otherwise secured firmly in place at an oblique angle to the vertical, as hereinafter specified, and the frames 2 also assuming inclined positions, resting at their lower ends upon the ground. As the ends 6 of the frames 2 are pivotally mounted upon the cross bars 8 it is obvious that any one or more of the frames may be raised, either temporarily or held in a raised position so as to serve in the nature of a gate, to admit ingress and egress of animals or the like at any desired point.

While the accompanying drawing illustrates what I believe to be the preferred embodiment of my invention, it is to be understood that the invention is not limited thereto, but that various changes may be made in the construction, arrangements and proportions of the parts without departing from the scope of the invention as claimed.

What is claimed, is:

1. A fence section comprising standards adapted to be secured in the ground, a cross bar connecting said standards together at their upper ends, a U-shaped frame having apertured ends pivotally mounted upon the cross bar, a filling secured to said frame, and means carried by said standards for connecting the corresponding standards of adjoining sections.

2. A fence comprising a plurality of correspondingly formed sections, each of which embodies a pair of standards, cross bars connecting said standards together at their upper ends, frames pivotally mounted upon said cross bars, the legs being secured in the ground in a position oblique to the vertical and the frames resting upon the ground at an inclination opposite to the inclination of the standards, clips connected to said standards, and yokes designed to embrace adjacent clips, as and for the purpose set forth.

In testimony whereof I hereunto affix my signature in the presence of two witnesses.

ROBERT C. NEELY.

Witnesses:
B. S. PALMER,
F. L. HUMPHREY.

Copies of this patent may be obtained for five cents each, by addressing the "Commissioner of Patents, Washington, D. C."